(12) United States Patent
Justus et al.

(10) Patent No.: US 7,890,643 B2
(45) Date of Patent: Feb. 15, 2011

(54) SYSTEM AND METHOD FOR PROVIDING PROGRAM CREDENTIALS

(75) Inventors: Dean Jason Justus, Monroe, WA (US);
Josh D. Benaloh, Redmond, WA (US);
Nathan James Fink, Seattle, WA (US);
Michael Howard, Redmond, WA (US);
Daniel R. Simon, Seattle, WA (US);
Matthew W. Thomlinson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/163,881

(22) Filed: Jun. 27, 2008

(65) Prior Publication Data

US 2009/0164795 A1    Jun. 25, 2009

Related U.S. Application Data

(63) Continuation of application No. 10/183,914, filed on Jun. 26, 2002, now abandoned.

(51) Int. Cl.
*G06F 15/173* (2006.01)

(52) U.S. Cl. .................. 709/229; 709/225; 709/223; 709/201

(58) Field of Classification Search ............... 709/229, 709/225, 223, 201
See application file for complete search history.

(56) References Cited

U.S. PATENT DOCUMENTS

| | | | |
|---|---|---|---|
| 4,315,101 A | 2/1982 | Atalla | |
| 5,491,752 A | 2/1996 | Kaufman et al. | |
| 5,838,812 A | 11/1998 | Pare et al. | |
| 6,052,785 A | 4/2000 | Lin et al. | |
| 6,178,511 B1 | 1/2001 | Cohen et al. | |
| 6,182,142 B1 | 1/2001 | Win et al. | |
| 6,230,272 B1 | 5/2001 | Lockhart et al. | |
| 6,463,474 B1 | 10/2002 | Fuh et al. | |
| 6,546,492 B1 | 4/2003 | Walker et al. | |
| 6,678,826 B1 | 1/2004 | Kelly et al. | |
| 6,725,376 B1 | 4/2004 | Sasmazel et al. | |
| 6,732,270 B1 | 5/2004 | Patzer et al. | |
| 6,760,841 B1 | 7/2004 | Fernandez | |
| 6,832,263 B2 * | 12/2004 | Polizzi et al. | 709/246 |
| 6,856,800 B1 | 2/2005 | Henry et al. | |
| 6,859,878 B1 | 2/2005 | Kerr et al. | |
| 6,889,222 B1 | 5/2005 | Zhao | |
| 7,069,433 B1 * | 6/2006 | Henry et al. | 713/151 |
| 7,111,323 B1 | 9/2006 | Bhatia et al. | |
| 7,170,998 B2 | 1/2007 | McLintock et al. | |

(Continued)

*Primary Examiner*—Thu Nguyen
*Assistant Examiner*—Lan-Dai T Truong
(74) *Attorney, Agent, or Firm*—Merchant & Gould P.C.

(57) ABSTRACT

A system for providing a client's credentials to a computer program comprises a database remote from the client and a single signon server module. The single signon server module can receive a request for the client's credentials from the computer program, determine whether the client's credentials are stored in the database, and send the client's credentials from the database to the computer program in response to a determination that the client's credentials are stored in the database. The single signon server module can store the client's credentials in the database in response to a determination that the client's credentials are not stored in the database. The single signon server module can encrypt the client's credentials prior to storing the client's credentials in the database and can decrypt the client's credentials prior to sending the client's credentials to the computer program.

19 Claims, 6 Drawing Sheets

U.S. PATENT DOCUMENTS

| | | |
|---|---|---|
| 7,350,229 B1 | 3/2008 | Lander |
| 7,484,247 B2 * | 1/2009 | Rozman et al. ............... 726/34 |
| 2001/0027527 A1 | 10/2001 | Khidekel et al. |
| 2002/0184507 A1 | 12/2002 | Makower et al. |
| 2002/0194473 A1 | 12/2002 | Pope et al. |
| 2003/0079143 A1 | 4/2003 | Mikel et al. |
| 2003/0079147 A1 | 4/2003 | Hsieh et al. |
| 2003/0105981 A1 * | 6/2003 | Miller et al. ................ 713/202 |
| 2003/0158949 A1 | 8/2003 | Miller et al. |
| 2003/0182551 A1 | 9/2003 | Frantz et al. |
| 2003/0188193 A1 | 10/2003 | Venkataramappa |
| 2003/0208613 A1 | 11/2003 | Signes et al. |
| 2003/0229788 A1 | 12/2003 | Jakobsson et al. |
| 2005/0240763 A9 * | 10/2005 | Bhat et al. .................. 713/169 |

\* cited by examiner

SYSTEM AND METHOD FOR PROVIDING PROGRAM CREDENTIALS

CROSS REFERENCE TO RELATED APPLICATION

This application is a continuation application of U.S. patent application Ser. No. 10/183,914, filed on Jun. 26, 2002, and entitled "SYSTEM AND METHOD FOR PROVIDING PROGRAM CREDENTIALS," which is incorporated herein in its entirety by reference.

FIELD OF THE INVENTION

The present invention relates generally to storing client credentials and mapping the client credentials to a computer program. More particularly, the present invention allows future access to a program after an initial input of the client's credentials for that program.

BACKGROUND OF THE INVENTION

Clients routinely access application programs containing sensitive data. To verify that a client has access rights to an application program, the application program receives credentials from the client. The credentials can comprise a domain name, a level of security access, a password, and other secure information about the client. The application programs can comprise human resources programs having sensitive personal information, retirement plan programs having sensitive information regarding a client's accounts, or other programs having sensitive data. Such application programs having sensitive data are commonly called "line-of-business" application programs.

For example, a large organization can have a human resources web page to provide information to the organizations employees (the clients). The web page can comprise an application program having sensitive information about each client. For instance, the sensitive information can comprise home address and telephone number, spouse's name, annual salary, previous pay sheets, and other information. When the client tries to access the application program on the human resources web page, the application program can request the client's credentials to verify the access rights of the client.

One conventional authentication method for verifying access rights requires the client to input manually the client's credentials each time the client accesses the application program. Problems associated with that type of authentication system include forgetting the credentials and the repeated, manual task of inputting the credentials.

A conventional process to improve the authentication method described above involves saving the client's credentials in a memory of the client's console. The credentials then are retrieved from the client's memory when requested by the application program. However, if the client accesses the application program from another client console, then the saved credentials are not available.

Furthermore, conventional methods save credentials by associating them with a particular uniform resource locator (URL) of the web page comprising the application program. Accordingly, if the URL of the web page changes, then the saved credentials become obsolete. Additionally, if the client accesses the same application program at a web page having a different URL, then the saved credentials do not apply. Furthermore, because the credentials are saved per web page, only one application program can be accessed at a time for each web page. A web page cannot provide automatic, simultaneous access to multiple application programs when the credentials are associated with a particular URL.

As an alternative to saving credentials in a local memory, another conventional authentication method involves hard coding all employee credentials into the application program. While removing the repeated step of manually inputting credentials, hard coding typically provides all clients with the same credentials. Accordingly, the security level of such a conventional system is lower than a system having unique credentials for each client. Additionally, the hard coded credentials typically are transmitted across a network, further decreasing the security level of the system. Finally, if the credentials change, then the computer code for the application program must be changed.

Accordingly, there is a need in the art for making the transfer of credentials to an application program transparent to the client. Specifically, a need exists for a single signon system and method that can allow future access to an application program after an initial input of the client's credentials for that application program. A need in the art also exists for remotely storing client credentials to allow access to any client's credentials from any client console. Furthermore, a need in the art exists for securely storing client credentials in a remote location. A need in the art also exists for storing credentials in relation to an application program, rather than in relation to a URL of a web page.

SUMMARY OF THE INVENTION

The present invention can provide a system and method for transparently transferring a client's credentials to one or more application programs. The present invention can provide future access to an application program after an initial input of the client's credentials for that application program. Additionally, by associating the client's credentials with application programs, the present invention can provide the client's credentials for multiple application programs. Accordingly, the present invention can allow simultaneous access and presentation of multiple application programs.

According to one aspect of the present invention, a client's credentials for an application program can be stored by a single signon system at a location remote from the client. The client can request access to the application program. The request can comprise information directing the application program to obtain the client's credentials from the remote location. Accordingly, the application program can send a request for the client's credentials to the single signon system. If the single signon system has stored the client's credentials, then the single signon system can send the client's credentials to the application program. If the single signon system has not stored the client's credentials, then the single signon system can obtain the client's credentials from the client, send the client's credentials to the application program, and store the client's credentials in the remote location.

The single signon system according to the present invention can encrypt the client's credentials prior to storing them in the remote location. To encrypt the credentials, the system can obtain a master secret from a master secret server module. The system then can encrypt the credentials using the master secret and a cryptographic provider. Alternatively, the system can encrypt the credentials using a secret or a certificate from the client. If the single signon system stores encrypted credentials, then the single signon system can decrypt the credentials prior to sending them to the application program.

By storing the client's credentials for future use, the client does not have to input manually the credentials each time an application program is accessed. By storing the client's credentials in a remote location, the client's credentials can be provided from any client console to an application program. By storing the client's credentials in relation to an application program, the credentials can remain constant even if the URL of the application program changes. Additionally, a web page can simultaneously present multiple application programs, and the client's credentials can be provided for each application program.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

Figure 1:
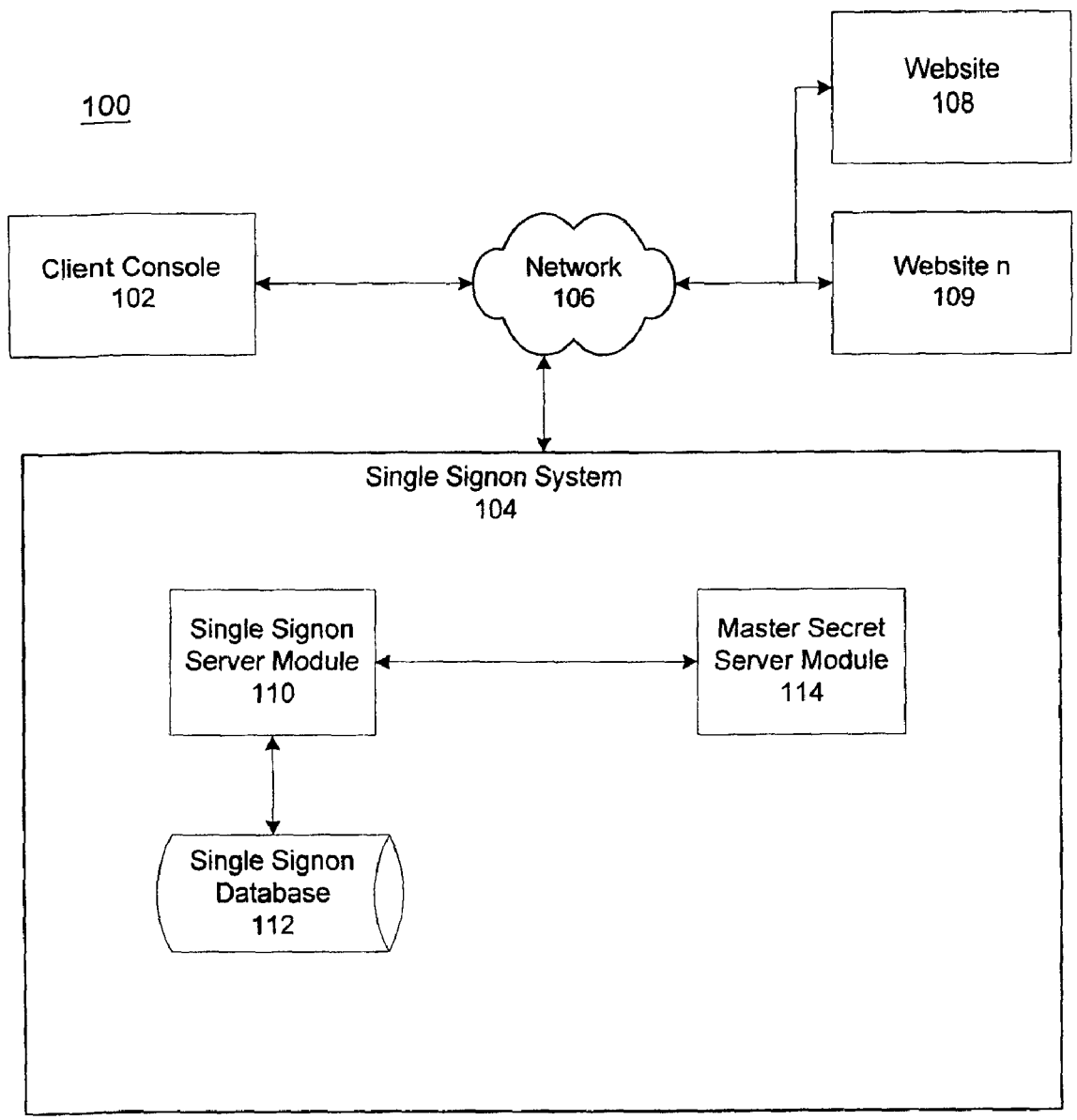
FIG. 1 is a block diagram depicting a representative computing environment for a single signon system according an exemplary embodiment of the present invention.

The present invention can provide a system and method for storing a client's credentials for future use to access a computer program. A single signon system can store the client's credentials for a computer program at a location remote from the client. The system can encrypt the client's credentials before storing them in the remote location. The client can request access to a computer program. The client's request can comprise information directing the computer program to obtain the client's credentials from the remote location. In response to the client's request for access to the computer program, the computer program can send a request for the client's credentials to the single signon system. If the single signon system has stored the client's credentials, then the single signon system can send the client's credentials to the computer program. If the stored credentials are encrypted, the system can decrypt the client's credentials prior to sending them to the computer program. If the single signon system has not stored the client's credentials, then the single signon system can obtain the client's credentials from the client, send the client's credentials to the computer program, and store the client's credentials in the remote location.

Although exemplary embodiments will be described generally in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The processes and operations performed by the software modules include the manipulation of signals by a client or server and the maintenance of those signals within data structures resident in one or more of local or remote memory storage devices. Such data structures impose a physical organization upon the collection of data stored within a memory storage device and represent specific electrical or magnetic elements. Those symbolic representations are the means used by those skilled in the art of computer programming and computer construction to effectively convey teachings and discoveries to others skilled in the art.

The present invention also includes a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description in conjunction with the Figures illustrating the program flow.

Referring now to the drawings, in which like numerals represent like elements, aspects of the present invention and exemplary operating environment will be described.

FIG. 1 is a block diagram depicting a representative computing environment 100 for a single signon system 104 according an exemplary embodiment of the present invention. The environment 100 comprises a client console 102 that typically comprises a graphical user interface for presenting and managing data in a convenient format for a client. The client console 102 also typically comprises a keyboard or other device to allow the client to interact with the single signon system 104 through a network 106. For example, the network 106 can comprise a local area network or the Internet.

The environment 100 also comprises a website 108, 109 connected to the client console 102 through the network 106. The network 106 connects the single signon system 104 to the websites 108, 109. Through the network 106, the client console 102 accesses a computer program module provided on one of the websites 108, 109. For example, the computer program module can comprise an application program having sensitive data. In an exemplary embodiment, the application program comprises a line-of business application program. Accordingly, the computer program module can require credentials before allowing a client to access the sensitive data.

In operation of the exemplary embodiment, the client console 102 sends a request to access an application program through the network 106 to one of the websites 108, 109. The access request comprises information indicating that the application program should obtain the client's access credentials from the single signon system 104. In response to the access request, the website 108, 109 sends a request for the client's credentials from the application program through the network 106 to the single signon system 104.

In the exemplary single signon system 104 of FIG. 1, a single signon server module 110 receives the application program's request for the client's credentials. The single signon server module 110 determines whether the client's credentials exist for the application program in a single signon database 112. If not, then the single signon server module 110 requests a client to enter the client's credentials through the client console 102. The single signon server module 110 receives the client's credentials from the client console 102 and forwards the client's credentials through the network 106 to the website 108, 109.

Additionally, the single signon server module 110 stores the client's credentials in the single signon database 112 for future use. Before storing the client's credentials, the single signon server module 110 can encrypt the credentials. In an exemplary embodiment, the single signon server module 110 obtains a master secret from a master secret server module 114. The master secret can be stored in the registry or other storage location of the master secret server module 114. The single signon server module 110 then uses the master secret to encrypt the client's credentials. In an alternative embodiment, the single signon server module 110 obtains a secret from the client console 102. The single signon server module 110 then uses that secret to encrypt the client's credentials. A cryptographic application program interface can generate the master secret on the master secret server module 114 or the secret from the client console 102. Alternatively, an administrator can input the secret for storage at the master secret server module.

Referring back to the application program's request for the client's credentials, if the single signon server module 110 determines that the client's credentials are stored in the single signon database 112, then the single signon server module 110 retrieves and forwards the client's credentials through the network 106 to the website 108, 109. If the client's credentials stored in the single signon database 112 are encrypted, then the single signon server module 110 decrypts the client's credentials before sending them to the website 108, 109. In an exemplary embodiment, the single signon server module 110 obtains the master secret from the master secret server module 114 to decrypt the client's credentials. Alternatively, the single signon server module 110 obtains a secret from the client console 102 to decrypt the client's credentials.

The single signon server module 110, the single signon database 112, and the master secret server module 114 can operate on a single computer. Alternatively, the single signon server module 110, the single signon database 112, and the master secret server module 114 can operate on individual computers.

In an exemplary embodiment, an application program comprises an individual application program or a group application program. For an individual application program, each client can have unique credentials to access the application program. For a group application program, a client can be a member of a group having access rights to the application program. An administrator can establish a single set of group credentials to allow all members of the group to access the application program. For example, the administrator can associate each client's security identifier ("SID") with the group's credentials.

In an exemplary embodiment, the single signon server module 110 stores a "credential table" of client credentials in the single signon database 112. The credential table can comprise information such as a name of each application program, a client's SID, and the client's credentials for each application program. The table can be indexed by the application name, the client's SID, or the client's credentials. The client's credentials can comprise group credentials or individual credentials. In an alternative exemplary embodiment, the single signon server module 110 also stores in the single signon database 112 a "program table" comprising a list of application names and an associated application type. The application type can be individual or group. In that embodiment, the program table can be searched for the application and the application type prior to searching for the client's credentials in the credential table.

By associating the credentials with an application program, rather than a web page URL, the credentials can be available for future use, even if the location of the application program changes. For example, if the URL of the application program on the website 108, 109 is changed, the single signon sever 110 still can provide the client's credentials by providing the client's credentials associated with the application program.

Additionally, associating the client's credentials with an application program, rather than with a web page URL, can allow a simultaneous display of multiple portals on the client console 102. Each portal can represent an application program on the websites 108, 109. The single signon server module 110 can process multiple credential requests and can provide the client's credentials for each application program. Accordingly, the client can access multiple application programs simultaneously in multiple portals on the client console 102.

For example, if four application programs are accessed simultaneously, the display on the client console 102 comprises four quadrants. Each quadrant can display one of the application programs accessed by the client. For instance, the application programs comprises the client's human resources website, retirement account website, electronic securities trading website, and another website. The single signon server module 110 can provide the client's credentials for each of the application programs. Then, the client can access simultaneously each of the application programs from the particular website.

Furthermore, the single signon system 104 can provide the client's credentials for each application program, without the client having to manually input the client's credentials each time an application program is accessed. The client can input the client's credentials the first time an application program is accessed. Then, the single signon server module 110 can store the client's credentials for future access to the same application program.

Alternatively, an administrator can input the client's credentials into the single signon database 112. Then, when the client accesses an application program, the single signon server module 110 can send the client's credentials from the single signon database 112 to the application program. Accordingly, the client does not have to know the client's credentials.

Additionally, because the credentials are stored in the single signon database 112 remote from the client console 102, the client's credentials can be available from any computer to access an application program. If the client logs into the single signon system 104 from a computer other than the client's main computer, then the single signon system 104 can provide the client's credentials to application programs based on the client's SID.

Figure 2:
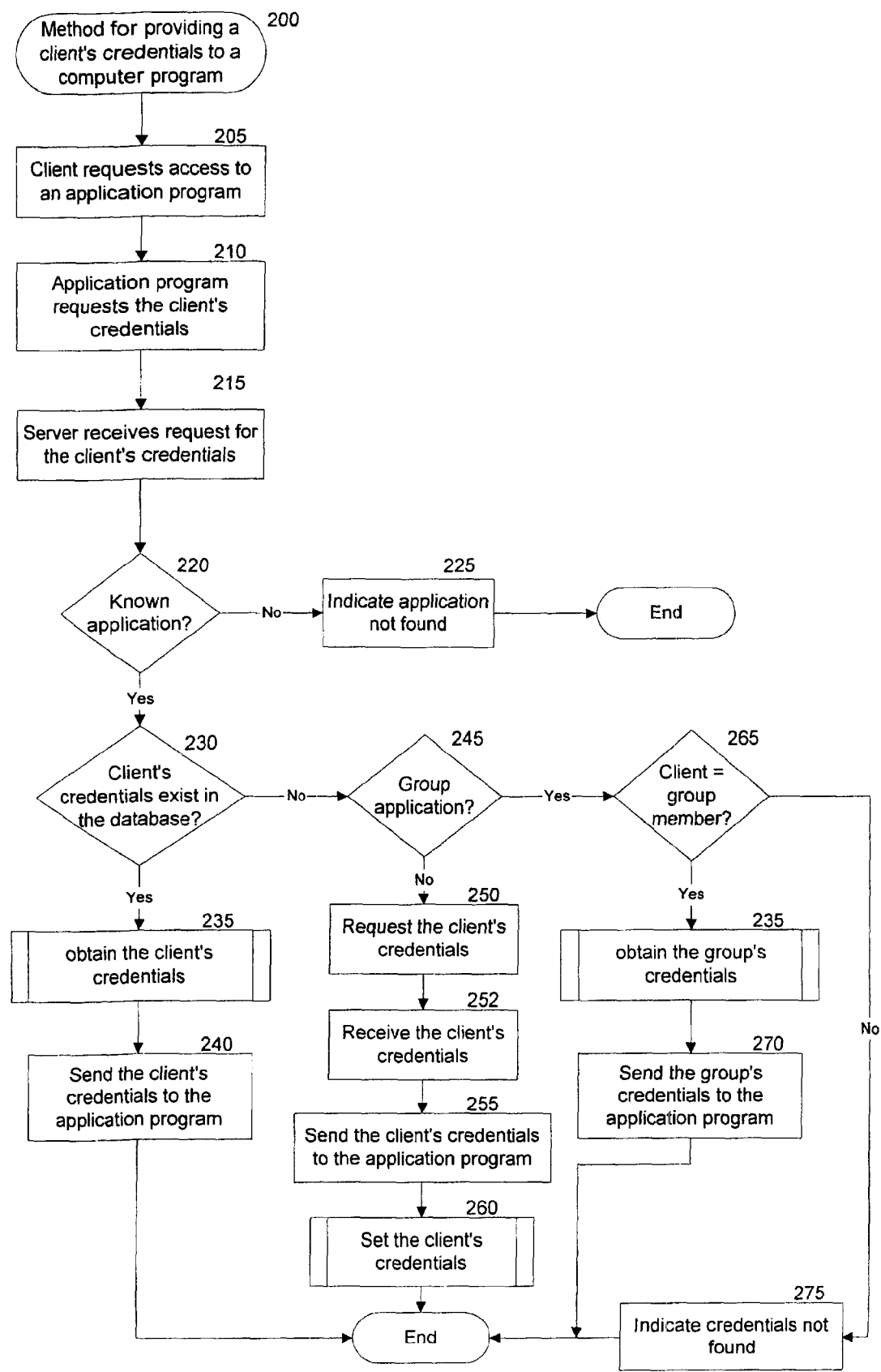
FIG. 2 is a flow chart depicting a method for providing a client's credentials to a computer program according to an exemplary embodiment of the present invention.

FIG. 2 is a flow chart depicting a method 200 for providing a client's credentials to a computer program according to an exemplary embodiment of the present invention. In step 205, the client console 102 sends a request to access an application program through the network 106 to the website 108 or 109. The access request comprises information directing the application program to obtain the client's credentials from the single signon system 104. After receiving the access request, the application program of the website 108, 109 requests the client's credentials in step 210. The website 108, 109 sends that request through the network 106 to the single signon system 104. In step 215, the single signon server module 110 of the single signon system 104 receives the application program's request for the client's credentials.

In step 220, the single signon server module 110 determines whether the application program comprises a known application. For example, the single signon server module 110 searches the credential table in the single signon database 112 to determine if the credential table includes the application program. Alternatively, the single signon server module 110 searches the program table in the single signon database 112 to determine if the program table includes the application program. If not, then the method branches to step 225. In step 225, the single signon server module 110 provides an indication that the credential table, or the program table, does not include the application program. For example, the single signon server module 110 displays a message on the client console 102, indicating that a system administrator should be contacted to add the application program to the single signon system 104.

Referring back to step 220, if the single signon server module 110 determines that the application program comprises a known application, then the method branches to step 230. For example, the single signon server module 110 can make that determination by searching the credential table in the single signon database 112 to determine that the credential table includes the application program. Alternatively, the single signon server module 110 can make that determination by searching the program table in the single signon database 112 to determine that the program table includes the application program. In step 230, the single signon server module 110 determines whether the client's credentials for the application program exist in the single signon database 112. For example, the single signon server module 110 searches the credential table for the SID associated with the client. After finding the SID, the single signon server module 110 determines whether the client's credentials exist for the application program.

If the single signon server module 110 determines that the client's credentials for the application program exist in the database, then the method branches to step 235. In step 235, the single signon server module 110 obtains the client's credentials from the single signon database 112. Then, in step 240, the single signon server module 110 sends the client's credentials to the application program at the website 108, 109.

Referring back to step 230, if the single signon server module 110 determines that the client's credentials for the application program do not exist in the single signon database 112, then the method branches to step 245. In step 245, the single signon server module 110 determines whether the application program comprises a group application. If not, then the method branches to step 250.

In step 250, the single signon server module 110 requests input of the client's credentials from the client console 102. A client can input the client's credentials into the client console 102, and the single signon server module 110 receives the client's credentials in step 252. In step 255, the single signon server module 110 sends the client's credentials to the application program at the website 108, 109. Then, in step 260, the single signon server module 110 sets the client's credentials by storing the credentials in the single signon database 112. Accordingly, the client's credentials can be available for future use.

Referring back to step 245, if the single signon server module 110 determines that the application program comprises a group application, then the method branches to step 265. In step 265, the single signon server module 110 determines whether the client is a member of the group having access rights to the group application. For example, the single signon server module 110 compares the client's SID to the group's member list. If the single signon server module 110 determines that the client is not a member of the group, then the method branches to step 275. In step 275, the single signon server module 110 provides an indication that the client's credentials were not found. Accordingly, the client console 102 is denied access to the application program on the website 108, 109.

Referring back to step 265, if the single signon server module 110 determines that the client is a member of the group, then the method branches to step 235. Because the client is a member of the group, the client's credentials comprise the group's credentials. In step 235, the single signon server module 110 retrieves the group's credentials from the single signon database 112. Then, in step 270, the single signon server module 110 sends the group's credentials to the application program on the website 108, 109.

Figure 3:
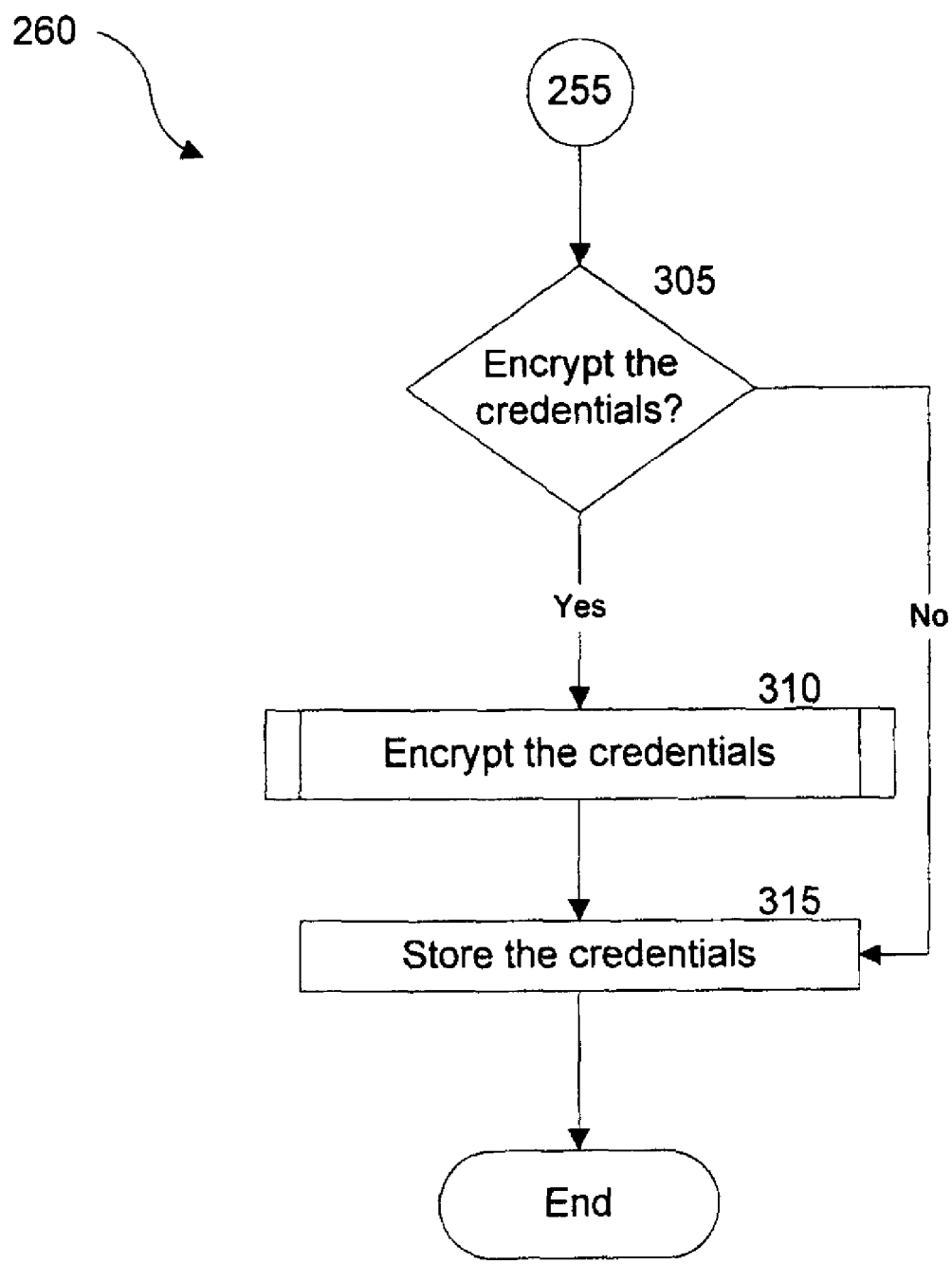
FIG. 3 is a flow chart depicting a method for setting credentials according to an exemplary embodiment of the present invention.

FIG. 3 is a flow chart depicting a method for setting credentials according to an exemplary embodiment of the present invention, as referred to in step 260 of FIG. 2. In step 305, the single signon server module 110 determines whether to encrypt the credentials for storage in the single signon database 112. Encrypting the credentials provides security for the credentials while stored in the single signon database 112. That security prevents unauthorized access to the stored credentials. If the single signon server module 110 will encrypt the credentials, then the method proceeds to step 310 to perform the encryption. Then, in step 315, the single signon server module 110 stores the encrypted credentials in the single signon database 112.

Referring back to step 305, if the single signon server module 110 will not encrypt the credentials, then the method branches directly to step 315. In step 315, the single signon server module 110 stores the unencrypted credentials in the single signon database 112.

The method described above with reference to FIG. 3 can apply to group or individual credentials. For example, a client can input the client's credentials in response to a request from the single signon server module 110. The method of FIG. 3 then can be used to set the client's credentials. Alternatively, an administrator can establish a group's credentials for client members of a group. The method of FIG. 3 then can be used to set the group's credentials.

Figure 4:
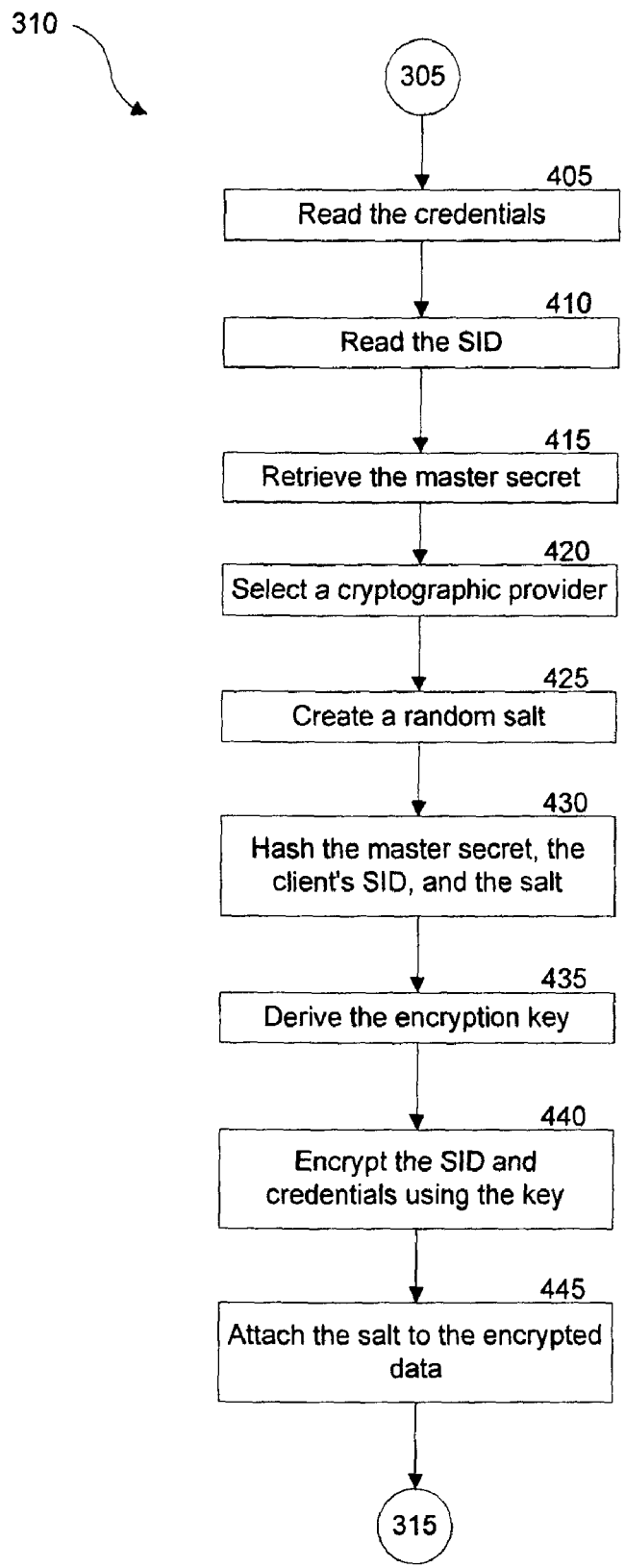
FIG. 4 is a flow chart depicting a method for encrypting credentials according to an exemplary embodiment of the present invention.

FIG. 4 is a flow chart depicting a method for encrypting credentials according to an exemplary embodiment of the present invention, as referred to in step 310 of FIG. 3. In step 405, the single signon server module 110 reads the credentials that it will encrypt. For an individual application program, the credentials comprise an individual client's credentials. For a group application program, the credentials comprise a group's credentials. In step 410, the single signon server module 110 reads the SID. For an individual application program, the SID comprises the client's SID. For a group application program, the SID comprises the group's SID.

In step 415, the single signon server module 110 retrieves the master secret from the master secret server module 114. The single signon server module 110 stores the master secret in non-pageable memory, which prevents the master secret from being paged to disk or mapped into the memory address space of another process. In step 420, the single signon server module 110 selects a cryptographic provider. The cryptographic provider comprises any encryption algorithm.

In step 425, the single signon server module 110 creates a random salt. The random salt comprises a four byte salt. For increased security, the random salt can be larger. For example, the random salt can comprise a sixteen byte salt. The single signon server module 110 creates the random salt by using a random cryptographic generation algorithm.

In step 430, the single signon server module 110 hashes the master secret, the SID, and the salt. Hashing the SID with the other information prevents one client from using the credentials of another. Any suitable cryptographic hash function can be used to perform the hashing step. From the hash, the single signon server module 110 derives the encryption key in step 435. The encryption key can be unique to the application program. In other words, each application program can have its own encryption key associated with it. The encryption key comprises a key of any size. In an exemplary embodiment, the encryption key comprises a 128 bit key.

In step 440, the single signon server module 110 encrypts the SID and the credentials using the key and the cryptographic provider. Encrypting the SID and the credentials prevents one client from accessing the credentials of another client. In step 445, the single signon server module 110 attaches the random salt to the encrypted data. For example, the salt can be prepended to the encrypted data. Alternatively, the salt can be attached to the end of the encrypted data. Attaching the random salt to the encrypted data allows the encryption key to be recovered by hashing the salt together with the master secret and the client's SID. The method then proceeds to step 315 (FIG. 4).

The encryption method described above with reference to FIG. 4 represents an exemplary embodiment for encrypting credentials. The present invention is not limited to the encryption method described above. Any suitable encryption method can be used to encrypt the credentials.

In an alternative embodiment, the single signon server module 110 obtains a secret from the client console 102. That secret then is used to encrypt the credentials. In another alternative embodiment, each client can be issued certificates for use in encrypting the client's credentials.

Figure 5:
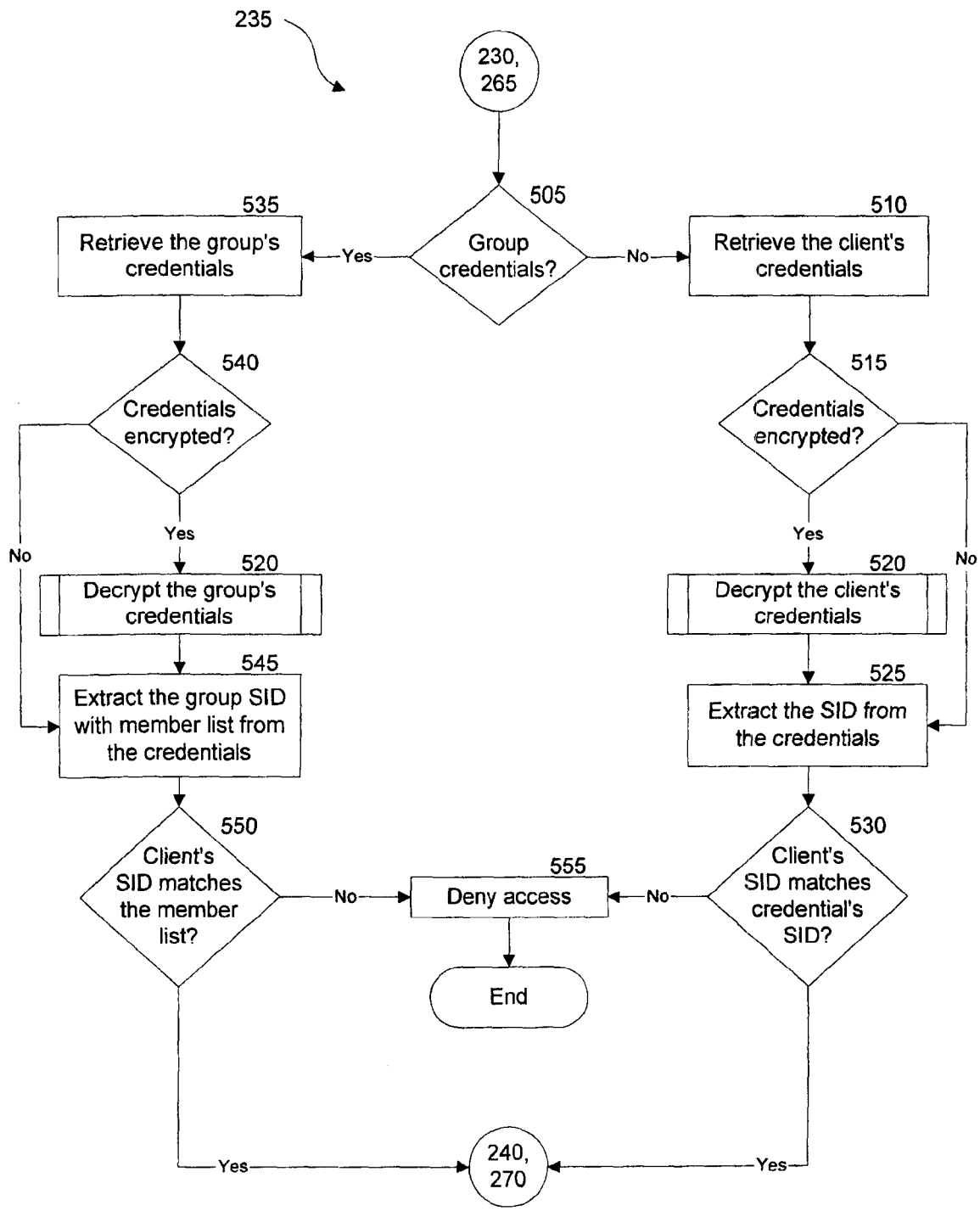
FIG. 5 is a flow chart depicting a method for obtaining credentials according to an exemplary embodiment of the present invention.

FIG. 5 is a flow chart depicting a method for obtaining credentials according to an exemplary embodiment of the present invention, as referred to in step 235 of FIG. 2. In step 505, the single signon server module 110 determines whether to retrieve a group's credentials from the single signon database 112. For example, the single signon server module 110 retrieves a group's credentials for a group application program. Alternatively, the single signon server module 110 retrieves an individual client's credentials for an individual application program.

If the single signon server will retrieve an individual client's credentials, then the method branches to step 510. In step 510, the single signori server module 110 retrieves the client's credentials from the single signon database 112. In step 515, the single signon server module 110 determines whether the retrieved client's credentials are encrypted. If yes, then the method branches to step 520. In step 520, the single signon server module 110 decrypts the client's credentials. The method then proceeds to step 525. Referring back to step 515, if the single signon server module 110 determines that the retrieved credentials are not encrypted, then the method branches directly to step 525.

In step 525, the single signon server module 110 extracts the SID from the retrieved credentials. Then, in step 530, the single signon server module 110 determines whether the client's SID matches the SID from the retrieved credentials. If the SIDs do not match, then the method branches to step 555, in which access to the application program is denied. If the single signon server module 110 determines in step 530 that the SIDs match, then the method branches to step 240 (FIG. 2).

Referring back to step 505, if the single signon server module 110 will retrieve a group's credentials, then the method branches to step 535. In step 535, the single signon server module 110 retrieves the group's credentials from the single signon database 112. In step 540, the single signon server module 110 determines whether the retrieved credentials are encrypted. If yes, then the method branches to step 520. In step 520, the single signon server module 110 decrypts the group's credentials. The method then proceeds to step 545. Referring back to step 540, if the single signon server module 110 determines that the retrieved credentials are not encrypted, then the method branches directly to step 545.

In step 545, the single signon server module 110 extracts the group SID from the retrieved credentials. The group SID can comprise a member list. The member list can comprise a list of client SIDs that are members of the group. The method then proceeds to step 550. In step 550, the single signon server module 110 determines whether the client's SID matches a SID from the member list of the group SID. If not, then the method branches to step 555, in which access to the application program is denied. If the client's SID matches a SID on the member list, then the method branches to step 270 (FIG. 2).

Figure 6:
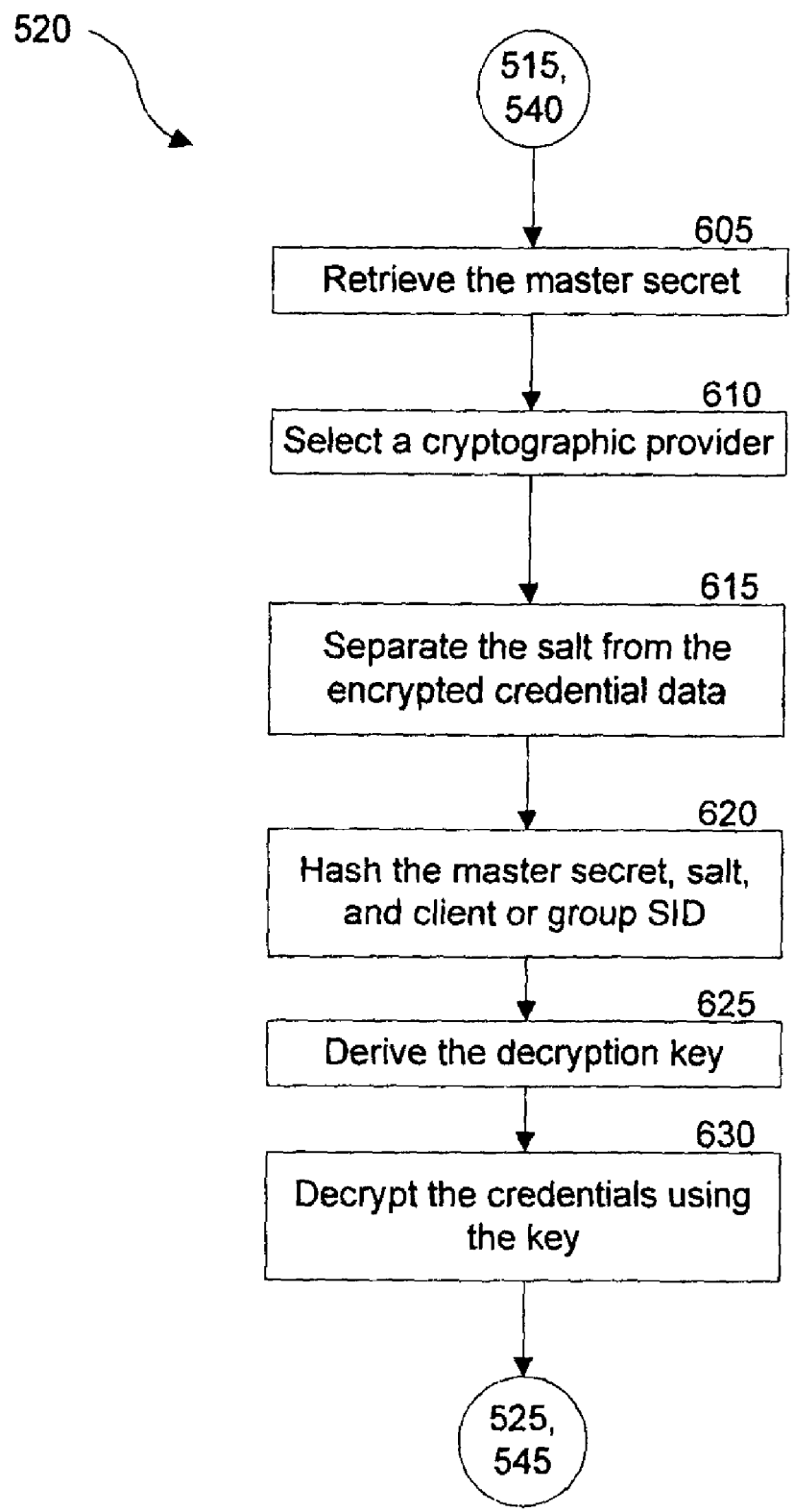
FIG. 6 is a flowchart depicting a method for decrypting credentials according to an exemplary embodiment of the present invention.

FIG. 6 is a flowchart depicting a method for decrypting credentials according to an exemplary embodiment of the present invention, as referred to in step 520 of FIG. 5. In step 605, the single signon server module 110 retrieves the master secret from the master secret server module 114. In step 610, the single signon server module 110 selects a cryptographic provider. The cryptographic provider can correspond to the cryptographic provider used to encrypt the credentials. In step 615, the single signon server module 110 separates the salt from the encrypted credentials. In step 620, the single signon server module 110 hashes the master secret, the salt, and the SID. The cryptographic hash function used to perform the hashing step can correspond to the hash function used during the encryption process. For an individual application program, the SID comprises the client's SID. For a group application program, the SID comprises the group's SID. From the hash, the single signon server module 110 derives the decryption key in step 625. Then, in step 630, the single signon server module 110 decrypts the credentials using the cryptographic provider and the decryption key. The method then proceeds to step 525 (FIG. 5) for individual credentials, or step 545 (FIG. 5) for group credentials.

The decryption method described above with reference to FIG. 6 represents an exemplary embodiment for decrypting credentials. The present invention is not limited to the decryption method described above. Any suitable decryption method can be used to decrypt the credentials.

In an alternative embodiment, the single signon server module 110 obtains a secret from the client console 102. That secret then is used to decrypt the credentials.

The present invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the present invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the present invention defined in the following claims, the scope of which is to be accorded the broadest interpretation so as to encompass such modifications and equivalent structures.

What is claimed is:

1. A computer-implemented method in a sign-on remote computer for providing user credentials to a computer program executing at a second remote computer, the sign-on remote computer and the second remote computer being located at different locations remote from a client computer under control of a user, there being a communicative connection between the sign-on remote computer and the second remote computer, a communicative connection between the sign-on remote computer and the client computer, and a communicative connection between the client computer and the second remote computer, the method comprising the steps of:
    storing the user credentials in a single sign-on database communicatively connected to the sign-on remote computer;
    receiving at the sign-on remote computer, via the communicative connection between the sign-on remote computer and the second remote computer, a request from the computer program executing at the second remote computer for the user credentials containing information identifying the user and useable for accessing the computer program, the computer program having received a request for access from the client computer, via the communicative connection between the client computer and the second remote computer, wherein the request for access did not include the user credentials;
    obtaining, by the sign-on remote computer, the user credentials from the single sign-on database, wherein the user credentials are specific to the computer program; and
    sending the user credentials, via the communicative connection between the sign-on remote computer and the second remote computer, from the sign-on remote computer to the computer program executing at the second remote computer in response to the computer program's request.

2. The computer-implemented method of claim 1, wherein the user credentials are included in credentials relating to a group of users.

3. The computer-implemented method of claim 2, further comprising determining whether the user is a member of the group.

4. The computer-implemented method of claim 1, further comprising encrypting the user credentials.

5. The computer-implemented method of claim 4, further comprising, prior to sending the user credentials, decrypting the user credentials.

6. The computer-implemented method of claim 1, further comprising extracting an identifier from the user credentials.

7. The computer-implemented method of claim 6, further comprising comparing the identifier from the user credentials to the information identifying the user included in the request.

8. The computer-implemented method of claim 7, further comprising determining a match between the identifier from the user credentials and the information identifying the user included in the request.

9. The computer-implemented method of claim 8, wherein sending the user credentials occurs upon determining a match between the identifier from the user credentials and the information identifying the user included in the request.

10. A computer-readable medium for providing user credentials from a sign-on remote computer to a computer program executing on a second remote computer, the sign-on remote computer and the second remote computer being located at different locations remote from a client computer under control of a user, there being a communicative connection between the sign-on remote computer and the second remote computer, a communicative connection between the sign-on remote computer and the client computer, and a communicative connection between the client computer and the second remote computer, and wherein the computer-readable medium does not consist of a propagated data signal, the computer-readable medium having computer-executable instructions for performing steps comprising:
    storing the user credentials in a single sign-on database communicatively connected to the sign-on remote computer;
    receiving at the sign-on remote computer, via the communicative connection between the sign-on remote computer and the second remote computer, a request from the computer program executing at the second remote computer for the user credentials containing information identifying the user and useable for accessing the computer program, the computer program having received a request for access from the client computer, via the communicative connection between the client computer and the second remote computer, wherein the request for access did not include the user credentials:
    obtaining, by the sign-on remote computer, the user credentials from the single sign-on database, wherein the user credentials are specific to the computer program; and
    sending the user credentials, via the communicative connection between the sign-on remote computer and the second remote computer, from the sign-on remote computer to the computer program executing at the second remote computer in response to the computer program's request.

11. The computer-readable medium of claim 10, having computer executable instructions for performing steps further comprising encrypting the user credentials.

12. The computer-readable medium of claim 11, having computer executable instructions for performing steps further comprising, prior to sending the user credentials, decrypting the user credentials.

13. The computer-readable medium of claim 10, having computer executable instructions for performing steps further comprising extracting an identifier from the user credentials.

14. The computer-readable medium of claim 10, having computer executable instructions for performing steps further comprising comparing the identifier from the user credentials to the information identifying the user included in the request.

15. A system for providing user credentials from a sign-on remote computer to a computer program executing on a second remote computer, comprising:

a single sign-on database remote from a client computer, the single sign-on database storing user credentials; and a single sign-on server module capable of:

receiving at the sign-on remote computer, via a communicative connection between the sign-on remote computer and the second remote computer, a request from the computer program executing at the second remote computer for the user credentials containing information identifying the user and useable for accessing the computer program, the computer program having received a request for access from the client computer, via a communicative connection between the client computer and the second remote computer, wherein the request for access did not include the user credentials;

obtaining, by the sign-on remote computer, the user credentials from the single sign-on database, wherein the user credentials are specific to the computer program; and sending the user credentials, via the communicative connection between the sign-on remote computer and the second remote computer, from the sign-on remote computer to the computer program executing at the second remote computer in response to the computer program's request.

16. The system of claim 15, wherein the sign-on remote computer and the second remote computer are located at different locations remote from the client computer.

17. The system of claim 15, further comprising a communicative connection between the sign-on remote computer and the client computer.

18. The system of claim 15, wherein the user credentials are included in credentials relating to a group of users.

19. The system of claim 15, wherein the single sign-on server module is further capable of storing user credentials in the single sign-on database.

* * * * *